United States Patent Office 3,086,774
Patented Apr. 23, 1963

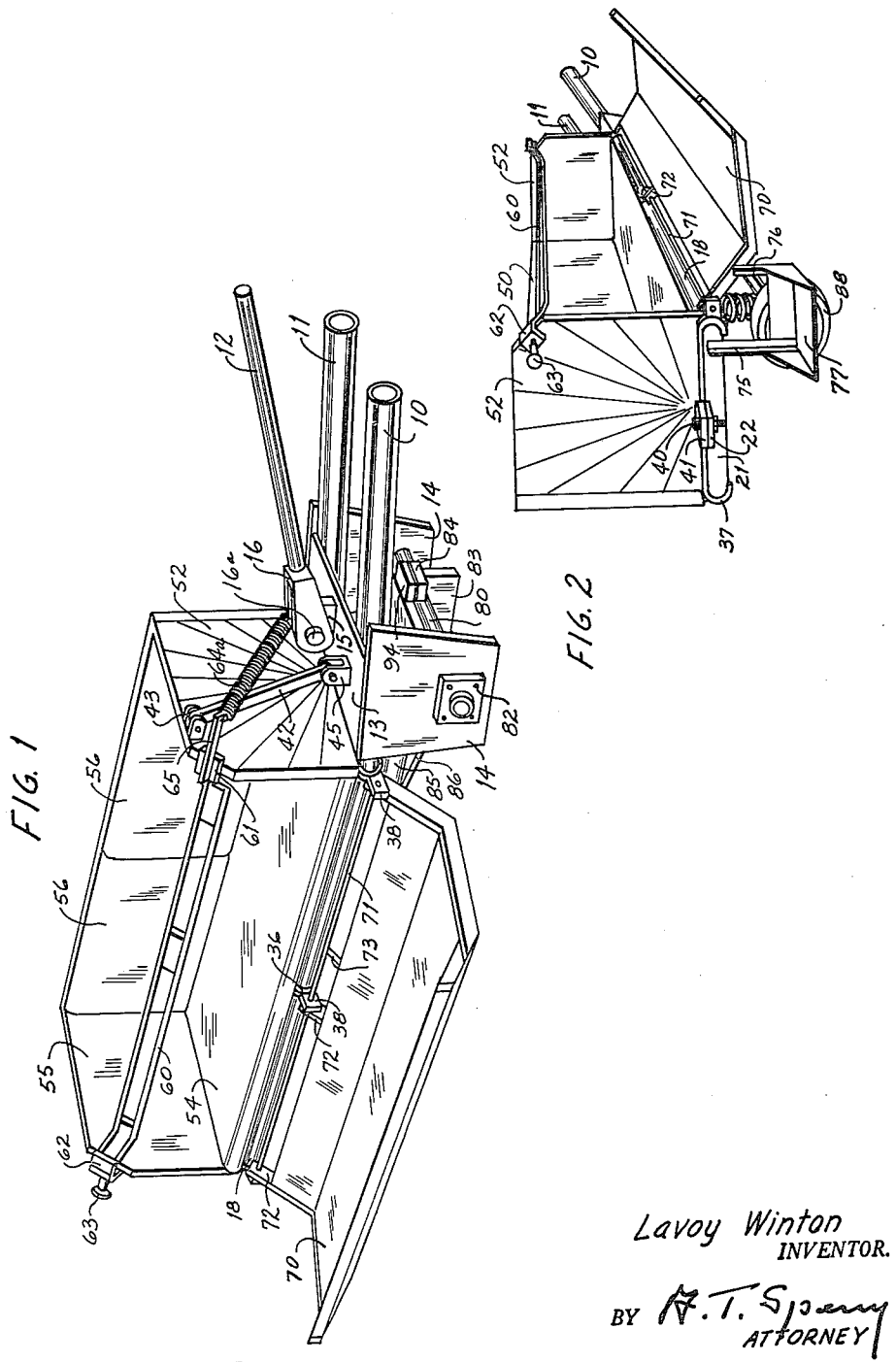

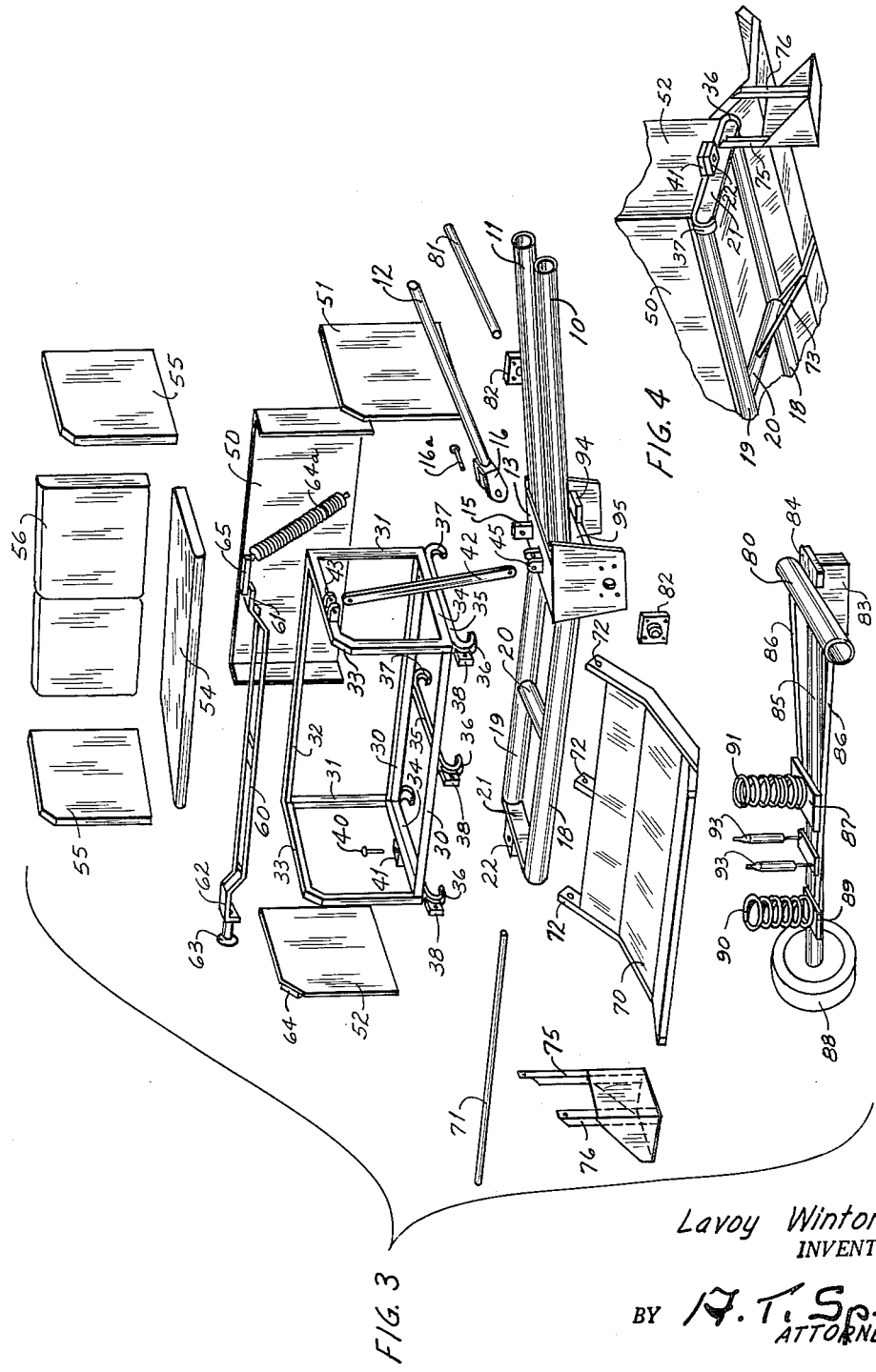

3,086,774
SAFETY SEAT AND MOUNTING MEANS IN COMBINATION THEREWITH
Lavoy Winton, 241 S. Clayton St., Mount Dora, Fla.
Filed Sept. 2, 1960, Ser. No. 53,814
8 Claims. (Cl. 272—44)

This invention relates to seat construction. While certain aspects of the present inventive concept may be broadly applicable to a wide variety of seat structures, the invention is particularly adapted as a vehicular seat particularly of the type used in amusement devices. More specifically, the present seat is designed for use in a round-about type of amusement device such as set forth in my co-pending application, Serial No. 52,399 filed August 29, 1960 and entitled "Amusement Device."

The invention is particularly directed to the provision of multiple safety factors in a seat of the character set forth, while maintaining simplicity of structure, economy of manufacture and ease of assembly and disassembly, as well as comfort and security for the occupant. It has long been recognized that the success or failure of many amusement devices is directly dependent upon the security of the seat attachment. Fatal injuries have resulted where an insecure attachment of the seat permitted it to be hurled from the motivating structure. In the amusement device as set forth in my co-pending application, and for which the present seat was specifically devise, the seats are mounted on radial arms rotated by a central axis in such manner as to move the seats up an inclined ramp and to pass from the ramp into space for a simulated free gravitational fall to a flat portion of the circular path of travel. The seat must, of course, be so secured as to prohibit any possibility of accidental detachment from its motivating arms. In addition thereto, means must further be provided to eliminate undue shock or vibration as the seat structure descends from the ramp and contacts the ground level support.

Therefore, it is among the objects of the present invention to provide a novel and improved safety seat including plural safety means, preventing inadvertent dislocation of the seat from its supporting and/or motivating means. It is a further object of the present invention to provide a seat assembly having plural safety means acting independently to preclude dangerous shock and jolting, as a result of the seat structure's impact with the ground level trackway. A further important object of the present invention, is to provide a structure readily designed for removal from its support to facilitate disassembly of the apparatus and storage of the seats for transportation. Numerous objects, features and advantages of the present invention will be apparent from a consideration of the following specification taken in conjunction with the accompanying drawings in which FIG. 1 is a perspective view of the assembled seat structure taken from the inner end of the seat showing its supporting arms and method of attachment thereto, FIG. 2 is a perspective view taken from the outer opposite end of the seat from that shown in FIGURE 1, FIG. 3 is an exploded view of the seat illustrating the individual parts thereof, and FIG. 4 is a fragmentary detailed outer end view of the assembled seat.

As above referred to, the present seat is specifically designed for use in connection with an amusement apparatus of the type set forth in my co-pending application referred to above. In that application each seat is supported from radially extending pivotally mounted pairs of arms here indicated at 10 and 11. In order to restrain the free gravitational fall of the seats with their arms upon departure from the upper end of the ramp, a restraining link 12 is provided which, by mechanical means and/or fluid pressure means, as shown in said application, limits the free downward movement of the arms and the seat.

For securing the outer end of the link 12 and for uniting the outer ends of the arms as well as supporting the wheel and cushion assembly of the seat structure, there is provided an inverted U-shaped bracket having a horizontal intermediate top plate 13 and depending parallel side walls 14. A central apertured upstanding lug 15 on the horizontal top plate 13, provides for the securement thereover of the furcated connect-clevis 16 of the outer end of the link 12 by a bolt 16A. The outer ends of the inclined portions of the arms 10 and 11 may be rigidly secured to the under-face of the central plate 13 and to the inner faces of the plates 14 in any suitable manner, as by welding.

For directly supporting and securing the seat, arms 10 and 11 may be extended as horizontal tubular frame supports 18 and 19 respectively. A central cross member 20 between the arms 18 and 19 provides rigid reinforcement and stability while the outer ends of the arms 18 and 19 are joined by a horizontal end plate 21 formed with a central outwardly projecting apertured lug 22 by which the seat frame may be safely secured.

The seat frame, as more clearly indicated in FIGURE 3, is of generally rectangular form including longitudinal parallel base rails 30, vertical back standards 31 and upper back rails 32 together with right angularly formed end pieces 33, and transverse end bars 34. Transversely arranged at the ends and intermediate the front and back bottom rails 30 there are provided securing members 35, having terminal front and back hooked end portions 36 and 37 respectively for purposes hereinafter to be discussed, each front hooked end portion 36 is provided with apertured forwardly projecting lugs 38.

The seat frame is securely mounted on the arm extensions 18 and 19 by a recto-lineal inward movement of the frame over said arms. As will be noted, the cross securing members 35 are equal in length to the spacing between the arm extensions 18 and 19 and thus the curved terminal hooked end portions 36 and 37 snugly embrace the arm extensions 18 and 19 as the frame slides inwardly over the arms to abut the U-shaped bracket. A final securement of the frame on the arms is provided by a safety locking bolt 40 extending through the outwardly projecting lug 41 of the center of the outer cross member 35 and the apertured lug 22. Safety securement of the seat frame is also provided by a strut 42 extending from a furcated block 43 facing outwardly from the center of the upper run of the inner end frame 33 and secured by similar furcated lug 45 mounted on the upper face of the plate 13. Thus when assembled on the arms 18 and 19 the seat frame is secured by the fixed curved extensions 36 and 37 and by the pin 40, as well as by the strut 42. Secure and safe mounting of the seat is thus assured, precluding the possibility of inadvertent movement of the seat frame from the arms. However, for purposes of storage and transportation the seat frame may be readily removed by removal of the pin 40 and disconnection of the strut 42, whereupon the seat may be moved longitudinally outward from the arms to be removed.

The seat structure is completed by provision of a back 50 and inner and outer end plates 51 and 52 respectively, which may be welded, bolted, or otherwise permanently secured to the seat frame. Seat, end and back cushions 54, 55 and 56 respectively, may be arranged within the seat frame for the passengers' comfort.

A further safety device for the passengers, is provided by a retaining bar 60 pivotally mounted to the inner end frame member by the block 61. The outer end of the bar 60 is formed with a U-shaped terminal 62. The arm or bar 60 may be locked in the securing position as shown in FIGURES 1 and 2 by the use of a manually reciprocated pin 63 which passes through the depending leg of the U-shaped end of the bar 60 to enter a perforate lock 64 secured to the outer plate 52 of the seat frame. The bar may be automatically raised from enclosing position on release of the pin 63 by a spring 64A extending from the plate 13 and engaging the projecting end 65 of the arm. While the pin 63 positively locks the bar in position, it may be released by an operator, attendant, or by the occupant, in which case the bar will be automatically raised by tension of the spring 64A which is tensioned by the downward movement of the bar to its protecting position.

The seat structure is completed by provision of a foot board 70 secured to the forward edge of the seat by a connecting pin 71, passing through the lugs 38 of the hooked end portions 36 and through lugs 72 extending rearwardly from the foot board. The foot board is secured against pivotal movement by a brace member 73 as shown in FIGURE 4, secured to the central cross member 20 between the arms 18 and 19 and underlying the foot board. The foot board is further secured in position by the upwardly extending straps 75 and 76 of a step 77. The strap 75 is bolted or otherwise firmly secured to the end plate 21 between the arms 18 and 19, while the strap 76 is bolted to the rear inclined portion of the foot board.

While the downward pivoted movement of the arms 10 and 11 is restrained by the link 12, an additional safety factor is provided by cushioning the terminal lowering movement of the seat as it comes to be supported at ground level. Thus, should there be a failure of the controlled downward movement of the arms, any violent impact is precluded by the provision of a pivoted wheeled carriage pivoted between the end plates 14 of the inverted U-shaped bracket.

This carriage includes a pivot tube 80 adapted for location between the plates 14 and secured for pivotal movement on a rod 81 passing through the plates and tubes and rigidly secured through bosses 82 mounted on the outer facing of the plates 14. To the under side of the tube 80 there is secured a block 83 formed with a projecting stop plate 84 and from which there extends a longitudinal shaft 85, suitably braced by rods 86, leading to a spring plate 87 secured on the upper face of the shaft. On the outer end of the shaft 85 there is mounted a supporting wheel 88. A second spring plate 89 supports the spring 90, which is parallel and companion to the spring 91 supported from the plate 87. Intermediate the springs 90 and 91 there are provided fluid shock absorbers 93. In assembly, it will be understood that the upper ends of the springs 90 and 91, as well as the upper ends of the fluid shock absorbers 93, will bear against the under side of the seat frame. This arrangement is such that in relaxed position while the seat is in the air, the frame and wheel 88 will be at a substantial angle with respect to the plane of the arms 18 and 19. When the seat descends, the wheel 88 will contact the track compressing the springs and the fluid shock absorbers to diminish the angle of the frame with respect to the wheel carriage, thus absorbing any shock which may occur either through an accelerated descent due to a relaxed tension by the link 12, or in the event the link 12 should fail entirely. Downward pivotal movement of the wheel carriage is limited by engagement of the stop plate 84 with a projection 94 on an intermediate cross plate 95 between the sides 14 of the inverted U-shaped bracket.

From the foregoing it will be seen that the present seat arrangement provides for multiple point securement of the seat, a positively locked protecting arm for the occupants, and spring and hydraulically controlled cushioning means to preclude undue shock as the seat descends to the ground. It will, of course, be understood that in the practice of the invention, numerous changes, modifications and the full use of equivalents may be resorted to without departure from the spirit or scope of the invention, as outlined in the appended claims.

What I claim is:

1. A seat and mounting means in combination therewith of the character set forth including a pair of parallel spaced arms, a seat frame, transverse members across the bottom of said frame and and hooks formed on the ends of said members engageable over said parallel spaced arms, the length of said members being substantially equal to the spacing of said arms whereby said hooks will snugly engage said arms as said frame slides longitudinally of said arms during assembly, and means for precluding longitudinal movement of said frame with respect to said arms, said means including registerable apertured projections fixed with respect to said frame and arms respectively and securing means extending through the apertures of said projections.

2. A seat and mounting means in combination therewith of the character set forth including a pair of parallel spaced arms, a seat frame, transverse members across the bottom of said frame and hooks formed on the ends of said members engageable over said parallel spaced arms, the length of said members being substantially equal to the spacing of said arms whereby said hooks will snugly engage said arms as said frame slides longitudinally of said arms during assembly, and means for precluding longitudinal movement of said frame with respect to said arms, said means including a link extending from the upper edge of one end of said frame to means fixedly secured to said arms.

3. The combination with a structure as defined in claim 2 of a pivotally mounted wheeled carriage secured to said arms and extending below said frame and yieldable means between said carriage and said frame.

4. An arm and seat assembly for amusement devices including parallel pairs of rotating and pivoting radial externally circular arms supporting passenger seats, each seat including a seat frame, transverse supporting bars under said frame of a length approximately equal to the spacing of each pair of arms at their outer extremities, curved ends on said bars whereby said ends will receive and snugly engage said arms upon longitudinal movement of said seat along said arms during assembly, and means to secure said frame against inadvertent longitudinal movement along said arms.

5. The structure set forth in claim 4 characterized by the fact that the bars are three in number, comprising end bars and a central intermediate bar to provide six arm engaging curved ends.

6. An arm and seat assembly for amusement devices including parallel pairs of rotating and pivoting radial externally circular arms supporting passenger seats, each seat including a seat frame, transverse supporting bars under said frame of length approximately equal to the spacing of each pair of arms at their outer extremities, curved ends on said bars whereby said ends will receive and snugly engage said arms upon longitudinally movement of said seat along said arms during assembly and means to secure said frame against inadvertent longitudinal movement along said arms, said means including a bolt engaged between said seat frame and a receiving element carried by said arms.

7. An arm and sat assembly for amusement devices including parallel pairs of rotating and pivoting radial externally circular supporting arms passenger seats, each seat including a seat frame, transverse supporting bars under said frame of a length approximately equal to the spacing of each pair of arms at their outer extremities, curved ends on said bars whereby said ends will receive and snugly engage said arms upon longitudinal movement of said seat along said arms, during assembly and means to secure said frame against inadvertent longitudinal movement along said arms, said means including a bolt engaged between said seat frame and a receiving element carried by said arms, and an angularly directed link secured between the upper end of said frame and said bars.

8. The assembly as set forth in claim 7 further including a foot board pivotally mounted from said bars and a step engaged between said frame and said foot board restraining pivotal movement of said foot board.

References Cited in the file of this patent

UNITED STATES PATENTS

| | | |
|---|---|---|
| 1,920,574 | Luzzi | Aug. 1, 1933 |
| 2,853,119 | Balfour | Sept. 23, 1958 |
| 2,895,735 | Bartlett | July 21, 1959 |